United States Patent
Beatson et al.

(10) Patent No.: US 9,286,457 B2
(45) Date of Patent: Mar. 15, 2016

(54) METHOD AND SYSTEM FOR PROVIDING PASSWORD-FREE, HARDWARE-ROOTED, ASIC-BASED AUTHENTICATION OF A HUMAN TO A MOBILE DEVICE USING BIOMETRICS WITH A PROTECTED, LOCAL TEMPLATE TO RELEASE TRUSTED CREDENTIALS TO RELYING PARTIES

(71) Applicants: Rodney Beatson, Odenton, MD (US); Mark A. Kelty, Catonsville, MD (US); Christopher J. Beatson, Cary, NC (US)

(72) Inventors: Rodney Beatson, Odenton, MD (US); Mark A. Kelty, Catonsville, MD (US); Christopher J. Beatson, Cary, NC (US)

( * ) Notice: Subject to any disclaimer, the term of this patent is extended or adjusted under 35 U.S.C. 154(b) by 69 days.

(21) Appl. No.: 14/198,695

(22) Filed: Mar. 6, 2014

(65) Prior Publication Data
US 2014/0365782 A1    Dec. 11, 2014

Related U.S. Application Data

(63) Continuation-in-part of application No. 12/931,340, filed on Jan. 31, 2011, now Pat. No. 8,842,887, which is a continuation-in-part of application No. 12/627,413, filed on Nov. 30, 2009, now Pat. No. 7,916,907, which is a continuation of application No. 11/151,412, filed on Jun. 14, 2005, now abandoned.

(60) Provisional application No. 60/579,422, filed on Jun. 14, 2004, provisional application No. 61/456,901, filed on Nov. 15, 2010, provisional application No. 61/851,884, filed on Mar. 15, 2013.

(51) Int. Cl.
| | |
|---|---|
| *G06F 21/32* | (2013.01) |
| *H04L 9/32* | (2006.01) |
| *G06K 9/00* | (2006.01) |
| *G06K 9/32* | (2006.01) |
| *H04L 9/08* | (2006.01) |

(52) U.S. Cl.
CPC ............ *G06F 21/32* (2013.01); *G06K 9/00187* (2013.01); *G06K 9/00926* (2013.01); *G06K 9/3283* (2013.01); *H04L 9/0861* (2013.01); *H04L 9/3226* (2013.01); *H04L 9/3231* (2013.01); *H04L 9/3242* (2013.01); *G06F 2221/2129* (2013.01); *G06K 2009/00953* (2013.01); *H04L 2209/16* (2013.01); *H04L 2209/80* (2013.01)

(58) Field of Classification Search
CPC ......... H04L 9/00; H04L 9/006; H04L 9/0643; H04L 9/08; H04L 9/0816; H04L 9/0822; H04L 9/0825; H04L 9/0861; H04L 9/0863; H04L 9/0866; H04L 9/32; H04L 9/3226; H04L 9/3242; H04L 2209/00; H04L 2209/16; H04L 2209/72
See application file for complete search history.

(56) References Cited

U.S. PATENT DOCUMENTS

| | | | | |
|---|---|---|---|---|
| 6,957,339 | B2 * | 10/2005 | Shinzaki ................. | G06F 21/32 713/186 |
| 7,711,152 | B1 * | 5/2010 | Davida et al. ........... | G06F 21/32 382/115 |

(Continued)

*Primary Examiner* — Andrew W Johns

(57) ABSTRACT

Biometric data are obtained from a biometric sensor on a mobile device, containing an ASIC, which is connected to or incorporated within it. The mobile device and ASIC, in combination or individually, capture biometric samples, extract biometric features and match them to a locally stored, encrypted template. For extra security, the biometric matching may be enhanced by the use of an entered PIN. The biometric template and other sensitive data are encrypted using hardware elements of the mobile device and ASIC, together with a PIN hash. A stored obfuscated Password is de-obfuscated and released to the mobile device authentication mechanism in response to a successfully decrypted template and matching biometric sample. A different de-obfuscated password may be released to authenticate the user to a remote computer and to encrypt data in transit. The system eliminates the need for the user to remember and enter complex passwords on the mobile device.

20 Claims, 4 Drawing Sheets

(56) References Cited

U.S. PATENT DOCUMENTS

| | | | |
|---|---|---|---|
| 8,171,298 B2 * | 5/2012 | Ramaswamy et al. | G06F 21/31 713/182 |
| 8,325,994 B2 * | 12/2012 | Davida | G06F 21/32 382/115 |
| 8,738,925 B1 * | 5/2014 | Park et al. | H04B 7/26 713/186 |
| 2002/0129285 A1 * | 9/2002 | Kuwata | G06F 21/32 713/202 |

* cited by examiner

ASIC and Stand-Alone Computer Components for Hardware-Rooted Authentication in a Trusted System PIN plus Biometric Match - Biometric Enrollment
Hardware Rooted

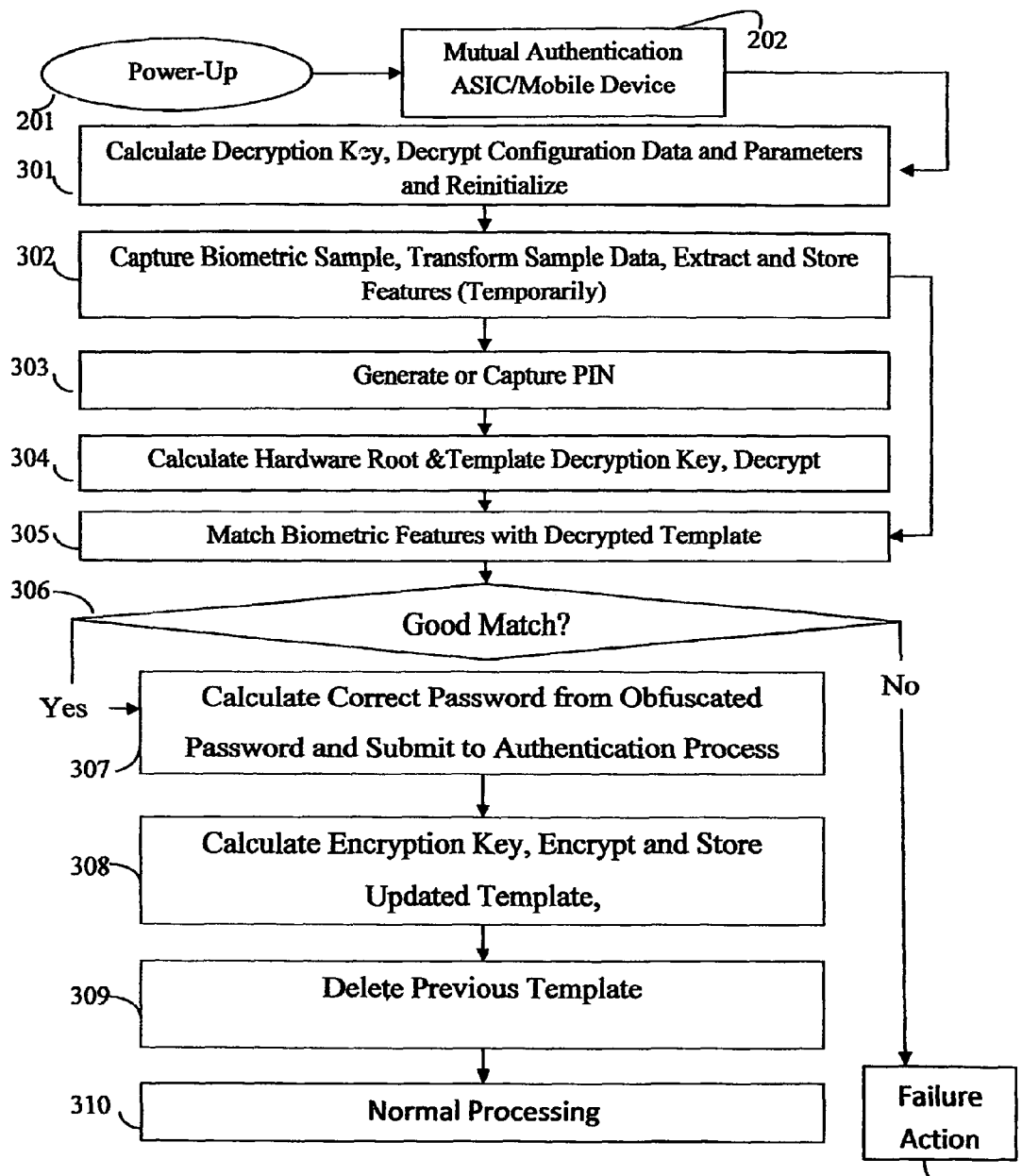
Figure 3 – Local Authentication Flow
Hardware Rooted Authentication

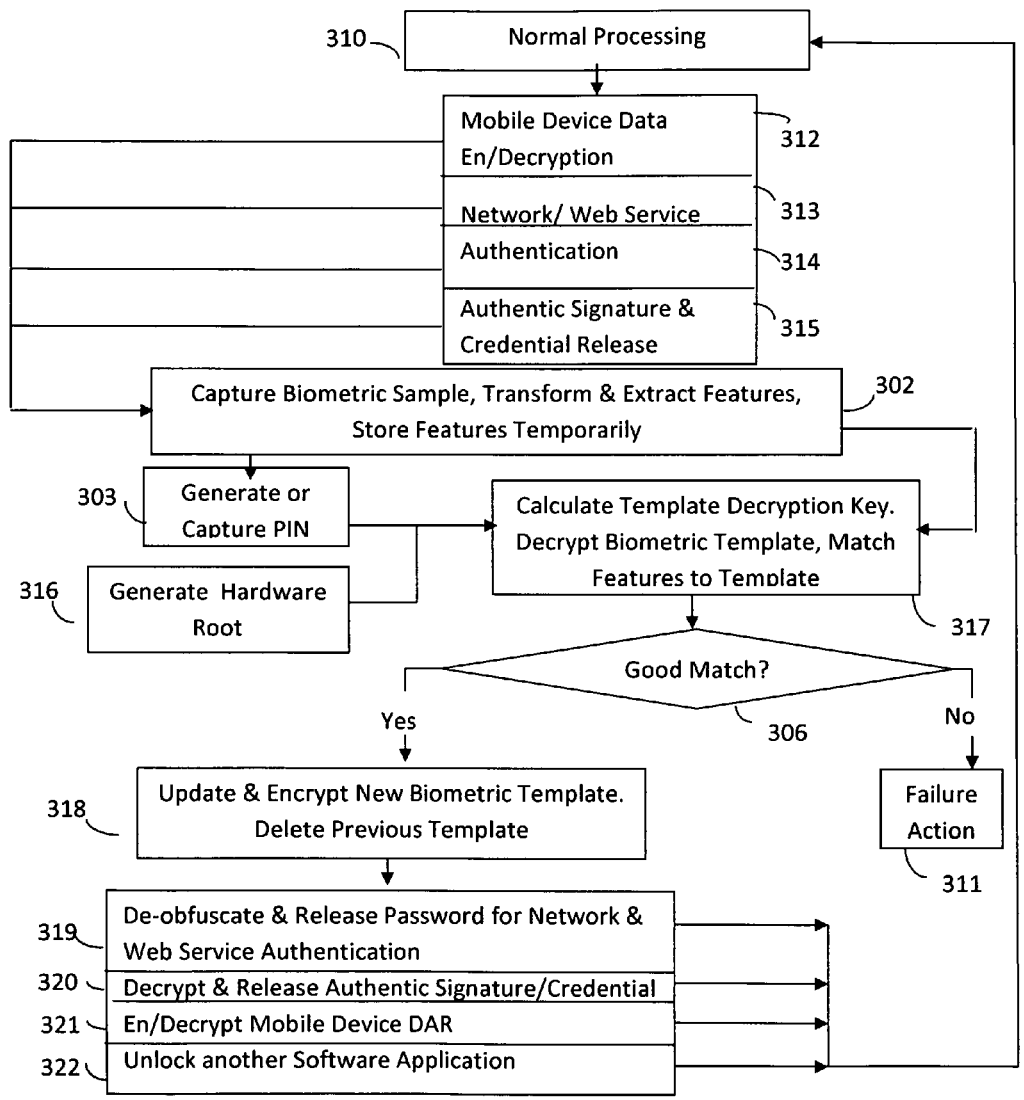
Figure 4- Wider Applications using Hardware-Rooted Encryption and Biometric Authentication

METHOD AND SYSTEM FOR PROVIDING PASSWORD-FREE, HARDWARE-ROOTED, ASIC-BASED AUTHENTICATION OF A HUMAN TO A MOBILE DEVICE USING BIOMETRICS WITH A PROTECTED, LOCAL TEMPLATE TO RELEASE TRUSTED CREDENTIALS TO RELYING PARTIES

RELATED APPLICATION DATA

This Application is a Continuation-in-Part of U.S. patent application Ser. No. 12/931,340, filed on Jan. 31, 2011, (now U.S. Pat. No. 8,842,887) which was a Continuation in Part of U.S. patent application Ser. No. 12/627,413 filed on Nov. 30, 2009, (now U.S. Pat. No. 7,916,907) which was a continuation of application Ser. No. 11/151,412, filed on Jun. 14, 2005, now abandoned. The Application claims the benefit of Provisional Application No. 61/851,884, filed on Mar. 15, 2013. Application Ser. No. 12/931,340 claims the benefit of Provisional Application No. 61/456,901, filed on Nov. 15, 2010 and Application No. 11/151,412 claims the benefit of Provisional Application No. 60/579,422 filed on Jun. 14, 2004.

BACKGROUND TO THE INVENTION

With the introduction of Bring Your Own Device (BYOD) policies into corporate and government enterprises, there is much concern about whether the device user is in fact the device owner, or authorized user, and whether the user has permission to access and manipulate enterprise data (from an enterprise server) held on the device. This same concern is present in mobile payment systems, where there are more and more cases of fraudulent card use and identity theft, which cost the banks and the consumer billions of dollars annually. These are very realistic concerns since about 5% of mobile devices and personal digital assistants (PDA's) are lost or stolen each year and counterfeit cards, created from illegally obtained, large lists of existing card numbers, are being used to defraud banks and the consumer. Many of the mobile devices and payment cards are not protected from fraudulent use by any method which would meet the requirements of a security-conscious organization. If the enterprise insists upon the user protecting the device (and access to the enterprise server) with a complex, changing password, the user resists this because of the difficulty of remembering and entering the password. If the device is protected by just a 4-digit PIN, this can be easily hacked in less than a minute or two, with a brute force attack. Many devices are not protected at all and the mobile device or payment card, falling into wrong hands can be a personal or corporate disaster or both.

Increasingly now, payment systems involve a mobile device or a POS terminal with electronic signature capture and may involve an integrated circuit payment card to "identify" the user. However in the event the card is a counterfeit copy or if it or the mobile device has been lost or stolen, a PIN, on its own, provides little defense.

Software solutions, based upon biometrics and other methods, do not necessarily solve the problem, since mobile device and POS terminal software can be changed by malware introduced by nefarious entities.

This invention solves the problems of:
1) Tying the user to a mobile device or Integrated Circuit card with a very high probability
2) Asserting a trusted mobile device ID or Payment card ID using hardware elements of the mobile device, an ASIC or IC component
3) Releasing trusted credentials or an authentic signature to a relying party
4) Providing strong encryption for data at rest and in transit
5) Providing tamper-proof software applications.

The invention addresses the implementation of hardware rooted mobile device ID generation and user identity verification, through biometric means incorporated into the Mobile Device itself, or into an Application Specific Integrated Circuit (ASIC) device, on or connected mobile device. It can also be applied to the integrated circuit of an IC chip card integrated into or connected to a stand-alone computer. The functions are accompanied by software signing techniques with a local biometric template, and data encryption to help ensure a secure operating environment for the mobile device or IC payment card. The stand-alone computer may be a POS terminal with an integrated IC card reader and signature capture capability, or a consumer mobile device.

The following description extracts salient parts of U.S. patent application Ser. No. 12/931,340, and adds to it new and improved aspects to create this Application.

FIELD OF INVENTION

The invention described herein is related to using biometric data samples, user knowledge of secret numbers, device hardware ID data and encryption in a cooperative manner to authenticate users of mobile devices, stand-alone computer users and users of integrated circuit cards, to enable storage of secure encrypted biometric templates and to provide the basis for them to be accepted as trusted devices to local or remote computers or servers without the need for the user to remember and enter complex passwords. Biometrics can be used in a local (to the mobile device) context, where the biometric template is held locally. Alternatively they can be used for remote authentication where the Biometric template is held on a server. In this latter case there is a National and International Standard for the exchange of biometric data as described in the Common Biometric Exchange File Format (CBEFF) standard. The term mobile device in this specification refers to any stand-alone computer that is generally used in a portable manner and the terms mobile device and stand-alone computer are used interchangeably.

The invention is described in the context of biometric data, and particularly signature/sign data, which is rotated to a consistent angle of inclination prior to feature extraction according to the patent application Ser. No. 12/627,413—now U.S. Pat. No. 7,916,907 and is applicable to any image-based biometric modality.

The invention combines the use of biometrics and a PIN to release complex passwords, with a hardware root of trust based upon an ASIC contained within the mobile device, or based upon the hardware characteristics of the mobile device itself, to provide authentication of and secure access for mobile device users to mobile devices, secure networks and enterprise servers. It is also used to identify users of Integrated Circuit Payment Cards. It uses the complex passwords, based on hardware roots, to generate strong encryption keys to protect the mobile device data and the biometric template, which is used to authenticate the user against a biometric sample submitted on the mobile device or stand-alone computer. This is achieved by using a special sensor on the mobile device or stand-alone computer, or capturing user input from already existing mobile device or stand-alone computer hardware, such as a screen digitizer (with a stylus or a finger input), or perhaps a mouse, camera, microphone or fingerprint sensor.

DESCRIPTION OF PRIOR ART

This invention is an improvement over software based solutions, which can be compromised by malware, especially on mobile devices with open source software. Beatson et al. in U.S. patent application Ser. No. 12/931,340 (now U.S. Pat. No. 8,842,887) describes a strong method, which is predominantly a software solution, using a hardware root of trust based on the mobile device UUID. The UUID is actually calculated via a software routine which can be compromised by malware introduced into the mobile device or stand-alone computer software. The current method further improves mobile device security Most biometric systems rely on the existence of a remote biometric template that is outside the immediate control of the user and could be compromised without the user being immediately aware of the fact. The local template of this invention, held on the mobile device, the ASIC or the IC chip of the payment card, puts the template control back in the hands of the user and thereby enhances the user's privacy as well as increasing the overall security of the mobile device and the payment card system.

The Trusted Computer Group is developing a Mobile Device Module similar in function to the Trusted Platform Module (TPM) used in many computers today but the method does not include any definitive biometric solution based upon a local biometric template. The current invention will enable the user to authenticate to the TPM by releasing a complex password to it. In addition the invention will combine all the necessary ingredients to create a trusted mobile device system, adding significantly to existing mobile device trust so that they can be used in a BYOD context, to connect to enterprise servers, improve the productivity of mobile workers and help to reduce payment card fraud and identity theft.

Today, there are billions of mobile devices in operation, most of which contain much sensitive, private and/or confidential information which is at risk in the event the device is lost or stolen. Mobile devices in this category include, but are not limited to Cell Phones, Smart phones Tablets, PDA's, laptops and other mobile devices. Following the introduction of capacitive finger touch and stylus sensitive Point-of-Sale (POS) terminals introduced in the early-mid 1990's which captured the electronic signatures of customers, there has been unprecedented growth in (finger) touch sensitive mobile devices sparked by the introductions of the iPhone, Android-based mobile devices, the iPad and Windows Phone 7 and 8 which all use capacitive screens for finger input. These mobile devices are very attractive consumer mobile devices and consequently, there is more pressure than ever for Enterprises to allow them to connect to corporate networks, particularly for email and cell phone use, and for banks to allow them to be used as on-line payment instruments. Connection to corporate networks for other purposes than email is allowed by some enterprises, whereas other enterprises choose not to allow such access because of the security risks involved—Is the mobile device user really the mobile device owner? The data accessible to these mobile device users (owners or not) contain, at least, highly confidential personal information, which could be used for financial payment card fraud, identity theft or for other nefarious purposes and, in other cases, confidential personal and corporate data which could be highly detrimental to the corporate entity if it came into the public domain. For government workers and the military, if these mobile devices fall into enemy hands or into the hands of foreign Governments and they do not have suitable protection the mobile devices can be detrimental to National Security Most of these mobile devices, if they are protected at all, rely upon the submission of a password, or just a simple PIN to gain access to the mobile device. The PIN, on its own, although relatively user friendly, is very insecure. It can be passed on, guessed, overseen at entry, or easily generated through a brute force attack (an automated attack based upon submitting sequential PIN values until the correct one is found). A four digit PIN will succumb within a minute or two to this form of attack. Depending upon the password, this too can be insecure for the same reasons. If the password is sufficiently complex to provide sufficient security (e.g. a regularly-changing, randomly-chosen eight-character string consisting of lower case, upper case, numeric and special characters) the password becomes difficult to remember and enter, especially on small mobile devices and is very user unfriendly. As a result of the inherent lack of security associated with the mobile devices many of them are not allowed to connect to their enterprise networks and this severely restricts their usefulness.

Over the last fifteen years or so and particularly since 9/11 there has come a realization that authentication systems based upon password entry at the keyboard or on the device are particularly vulnerable to unauthorized and unfettered access from many different sources and are particularly user-unfriendly. This despite increasingly sophisticated encryption methods and algorithms. The science of Biometrics promotes the capture of samples of biological properties or behavioral characteristics of individuals and extracts measurable features from the samples to be compared with stored templates. The science has made much progress in the last few years and there are now many such systems in situ protecting access to physical and logical assets by ensuring that access rights are granted only to authentic individuals and denied to imposters. Image-based biometric systems, which use Fingerprint and Palm patterns, Face and Iris patterns, Hand Geometry and Vein analysis, etc., are all in use or under current development. Dynamic or behavioral biometric systems, which introduce the dimension of time into the sample analysis rely upon the submission of stylus or finger-based Signs or Signatures and Voice or Keystroke patterns and are also being used for similar applications. The behavioral biometric technologies have several advantages over systems based purely upon physiological imaging technologies. For example, they offer the possibility of user-chosen, secret-based templates preserving privacy, increasing performance and allowing template revocation and replacement in the event of compromise.

This invention relies upon a means of obfuscating a password, storing it and protecting it in such a way as to make it extremely difficult to extract. This password is then used to generate symmetrical encryption keys to protect the template and other data at rest (DAR) on the mobile device.

One of the major issues in using biometric systems for protecting access to mobile devices has been the problem of protecting a local biometric template from being extracted from the mobile device in the event of its loss or theft. If a password based encryption key is used then the system access is again reliant upon the entered password. One of the inherent properties of biometric samples is that successive samples from the same user are never the same, although they might be very similar, especially in the case of image based biometric samples. Consequently the sample cannot be used to generate a constant encryption key without some degradation of performance of the overall biometric system.

References associated with the parent of this Continuation-in-Part application have discussed other systems that attempt to do this and there have been other systems and patents also trying to accomplish the difficult task of successfully obfuscating passwords. Transaction Security, Inc., Beatson & Kelty, in 2003, developed an unpatented system, called PDA-Protect®, which was beta-tested by Microsoft. This was documented in a Press Release dated May 27, 2003 entitled "Transaction Security, Inc. Unveils Crypto-Sign™ Biometric Software for The Mobile Workforce".

See: www.crypto-sign.com/Crypto-Sign %20Press %20Release5_12-pp .pdf. This was a very early prototype and, although it released an obfuscated password, it did not protect it or the biometric template fully. Johansson et al. in U.S. application Ser. No. 10/990,798 (filed Nov. 17, 2004) proposes an asymmetrical key pair approach but this makes the encryption computing and key management very burdensome. The current invention advocates a system that relies upon a symmetrical encryption process such as the Advanced Encryption Standard and key definition and management is an important aspect of the process.

In addition the current invention advocates a solution incorporated into an IC chip, which uses a Chip ID rooted in the Chip hardware, which can be used to securely store an electronic representation of the user's signature as well as the biometric template. It also contains code incorporated in the IC Chip, to provide a biometric matching capability for signatures submitted on POS terminals. An IC Card-based signature system was proposed in 1996 (by two of the current authors of this application) in U.S. Pat. No. 5,892,824. However that system relied upon the release to the POS terminal of the biometric template and this would be considered insecure today.

This application proposes a system and methods to:

a) Securely authenticate the user to the mobile device by automatically releasing a password to the mobile device authentication system in response to a matched biometric sample and a correct PIN.

b) Authenticate the user and the mobile device to a remote computer or server to provide a trusted mobile device system.

c) Remove the need for the user to remember and enter complex passwords, whilst retaining the benefits of complex password infrastructure for authentication and encryption.

d) Encrypt the biometric template and other data on the mobile device or payment card IC chip without the need to enter a complex password.

e) Automatically generate strong encryption keys for mobile device data and template encryption and to protect secure data communications between the mobile device and a server.

f) Release trusted credentials, including electronic signatures, to provide proof of authorship for transactions and electronic documents, especially for Point of Sale transactions

SUMMARY OF THE INVENTION

The system and methods described in this Patent Application use a technique for combining a numeric PIN, hardware components of a mobile device or of an ASIC incorporated within the mobile device or connected to it. A similar technique can be incorporated within the integrated circuit of an IC card chip. They use an obfuscated, user-chosen (or imposed) complex, secure password with a biometric sample, in a way that provides secure and user-friendly access to these types of mobile devices and also provides for secure template and data encryption, all without the need to remember or enter a complex password. This secure, user-friendly method releases the required password to the mobile device authentication process or the network authentication process once a correct PIN and biometric sample are submitted and does so without the need for the complex password to be entered or remembered for each transaction. The method further provides the mobile device/user with trusted status to a remote computer. Consequently it could open up comprehensive, secure and user-friendly use of mobile devices and integrated circuit cards to enterprises and mobile payment applications with all the attendant significant security and productivity benefits.

Most mobile devices offer an optional or mandatory power-up password authentication process as part of the operating system to protect access. The present invention harnesses the power-up password authentication process but, instead of requiring entry of the password, it is generated by the mobile device each time after a successful entry/supply of the PIN and a successful match of a biometric sample to the template stored on the mobile device. The method first uses a one way hashed value of the PIN combined with a stored value of the obfuscated password (obfuscated using a function of the mobile device or ASIC hardware components and the PIN hash together with a reversible algorithm) to generate a key to decrypt (and encrypt) the biometric template.

The biometric sample is captured, followed, where required by the PIN, which may be entered by the user (for higher security) or generated by the mobile device software. The features extracted from the biometric sample are provided to the matching process along with the decrypted biometric template. The obfuscated password, a function of the PIN hash, certain hardware components of the ASIC, and the Password itself, are used both in the generation of the template encryption/decryption key and in the generation of the password required by the authentication system to provide access. If there is a good biometric match, the password is generated by de-obfuscating the stored obfuscated Password and passing it to the authentication process. Thus the de-obfuscation process and hence the password release (or the private key release) requires, as well as a successful biometric match, a successful submission of the correct PIN, either from a PIN entry screen, (if required by the owner's security policy) or from the generation of a PIN rooted in the mobile device, ASIC or IC card chip hardware components.

The method demands successful submission of the PIN to the system and a good biometric sample, which work together to unlock the mobile device. If the PIN is supplied incorrectly the template decryption key will be wrong and the clear template will be gibberish. If the biometric sample is submitted incorrectly, there will be no match to the template. Both the template encryption/decryption key and the de-obfuscated password are functions of PIN-generated data, supplied on a transaction by transaction basis, as well as mobile device, ASIC or IC card hardware components and the original chosen (or imposed) password. An imposter would not be able to test first for the correct PIN and then for the correct biometric sample (or vice-versa) since both components must be entered sequentially on each occasion without knowledge of whether either one is correct. Consequently the method provides good protection against brute force attacks. Millions of biometric samples/PIN combinations would have to be submitted to find a correct one and because a biometric sample is required on each occasion this becomes totally impractical. Yet the process is still very user friendly since all it requires is the entry of a PIN and a biometric sample, or just a biometric sample alone. It does not require that the user remember or enter a complex password. The generated password can be used later as the basis for data encryption/decryption on the mobile device and for network communication and encryption using the secure socket layer in a PKI-based system. In this manner the mobile device may be recognized as a trusted mobile device by an authentication server or a remote computer and may be extended to cover the case where the mobile device is being used to gain access via a server, to a central data-base. Some of the methodology described in this application is described in US Patent Application Publication numbered 20030056100 authored by one of the current inventors and this document is incorporated herein by reference. Some of the concepts described herein can be adapted to the use of an IC (smart) card presented to an IC card reader with an integrated biometric sensor device that might be used, for example at point of sale. Here, biometric feature data generated, by the stand-alone computer containing the IC card reader (POS terminal), which could also be a mobile device, e.g. a tablet with an IC Card reader, could be captured and compared (using the IC chip processor) to the template stored securely in the IC chip memory. A successful PIN and biometric sample could then release the user's authentic signature or some other credential, indicative of end-user authentication, to a remote computer system.

BRIEF DESCRIPTION OF THE DRAWINGS

FIG. 3 shows the User Authentication and Encryption logic of a trusted mobile device with a local biometric template.

FIG. 4 shows the wider use of a trusted mobile device incorporating the invention.

DESCRIPTION OF PREFERRED EMBODIMENTS

In the following description, reference will be made particularly to Signature/Sign biometric data, which may be entered onto a mobile device or POS terminal screen, as may a PIN. It will be very apparent that the biometric modality could be, for instance, instead of signature/sign, a fingerprint using a fingerprint sensor, a facial image, using a device camera or an iris image using an iris camera on the device, or indeed any other image based biometric data generated on the device from a suitable sensor.

Figure 1:
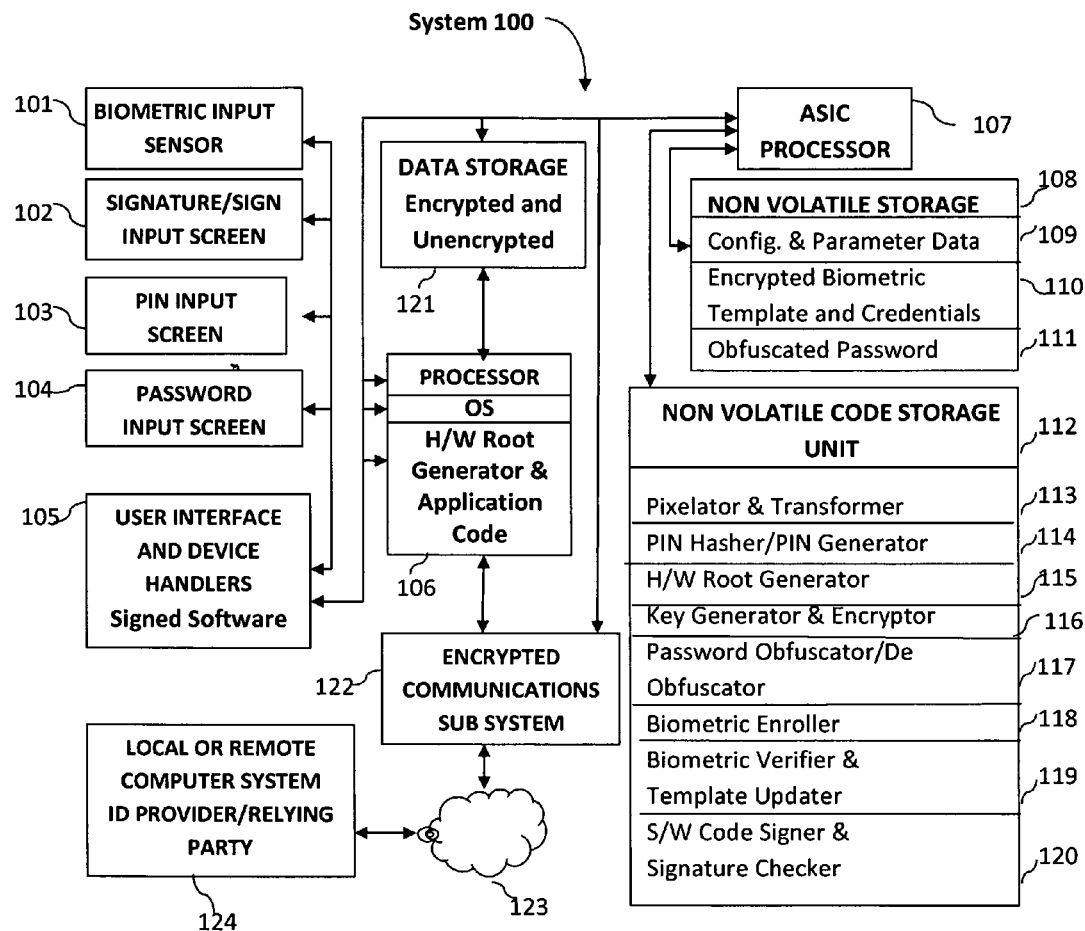
FIG. 1 describes the components of an exemplary mobile device system and associated ASIC so that they work together to provide the necessary functions for a trusted mobile device with a local biometric template.

Referring now to FIG. 1, System 100 shows the components and functionality of an exemplary mobile system configuration in simplified form for implementing the present invention. It is to be understood that the unit components illustrated in System 100 may be activated by the mobile device processor and associated OS, with application code (106) using the data in Data Storage area (121) or by the self contained ASIC components (107-120). System 100 incorporates a processor, with operating system and application code (106) and a data storage area (121) for both encrypted and unencrypted data, used for various mobile device applications. The input devices (101, 102, 103 and 104) are driven and handled by the Device Handler Software (105). This software is signed with a specific authentication value, which is passed to and checked by the ASIC device processor (107) using the Software Code Signer and Signature Checker (120) prior to each activation. The Biometric Input Sensor (101) could be a fingerprint sensor, an iris camera or a face camera or another biometric device, such as a microphone, integrated into the mobile device. In this embodiment the Signature/Sign Input Screen (102) is used to capture a signature/sign biometric sample and also to capture an authentic electronic signature of the mobile system user. The biometric input data, from signature/sign screen (102), then passes to ASIC processor (107), where it is processed according to the Code in the ASIC Code Storage Unit (112). It is to be understood that, in an alternative embodiment, it is possible for the mobile device to contain all the functionality of the ASIC, in which case the ASIC would not be a necessary component of System 100. In this embodiment we describe System 100 as ASIC-based.

Signature/sign biometric data are captured via the signature/sign input screen (102), pixelated and transformed to a consistent angle of inclination by the ASIC-based Pixelator & Transformer software (113). The PIN Input Screen (103) provides PIN input where required and the Password Input Screen (104) provides Password input for the registration and enrollment phase. The ASIC Code Storage Unit (112) contains other software functionality modules (114, 115, 116, 117, 119 and 120). These modules, which might, alternatively, be contained in the mobile device application code storage area (106), operate to implement the methods described later for providing secure access to the mobile device using a combination of PIN and biometric sample without the need to remember or enter a Password. The Code Storage Unit (112) contains a Key Generator and Encryptor module, which is responsible for key generation, hashing and encryption/decryption. System 100 contains the Non-Volatile Data Storage area (108) and, in particular, Configuration & Parameter data, encrypted with a key generated from the H/W Root Generator (115) and Encrypted Biometric Template and Credential data (110) including a representation of the authentic signature of the device owner. The data in (110) are encrypted using module (116) and a key generated from the obfuscated password (111), the Hardware Root, generated by Hardware Root Generator (115) and the PIN hash, generated from the PIN entry, data or automatically by the PIN Generator (114) The non-volatile storage area (108) also provides for the storage of other sensitive (chosen by the enterprise or the user) mobile device data and encrypted with the same key as the biometric template. This embodiment describes an electronic representation of the owner's authentic signature as the credential of choice and this is stored in encrypted form with the encrypted biometric template in (110). Non Volatile storage area 108 also contains an obfuscated password (111) and the way in which this is obfuscated by the Password Obfuscator/De-obfuscator is described later. Storage area (108) contains configuration and parameter data (109) which is used to customize the System to Enterprise and User requirements. The Encrypted Communications System 122 provides a secure link, via a public or private network system, to a Local or Remote Computer System or Server 124, which could also be contained within the Cloud Network System 123, as opposed to existing as a separate physical entity outside the Cloud.

Figure 2:
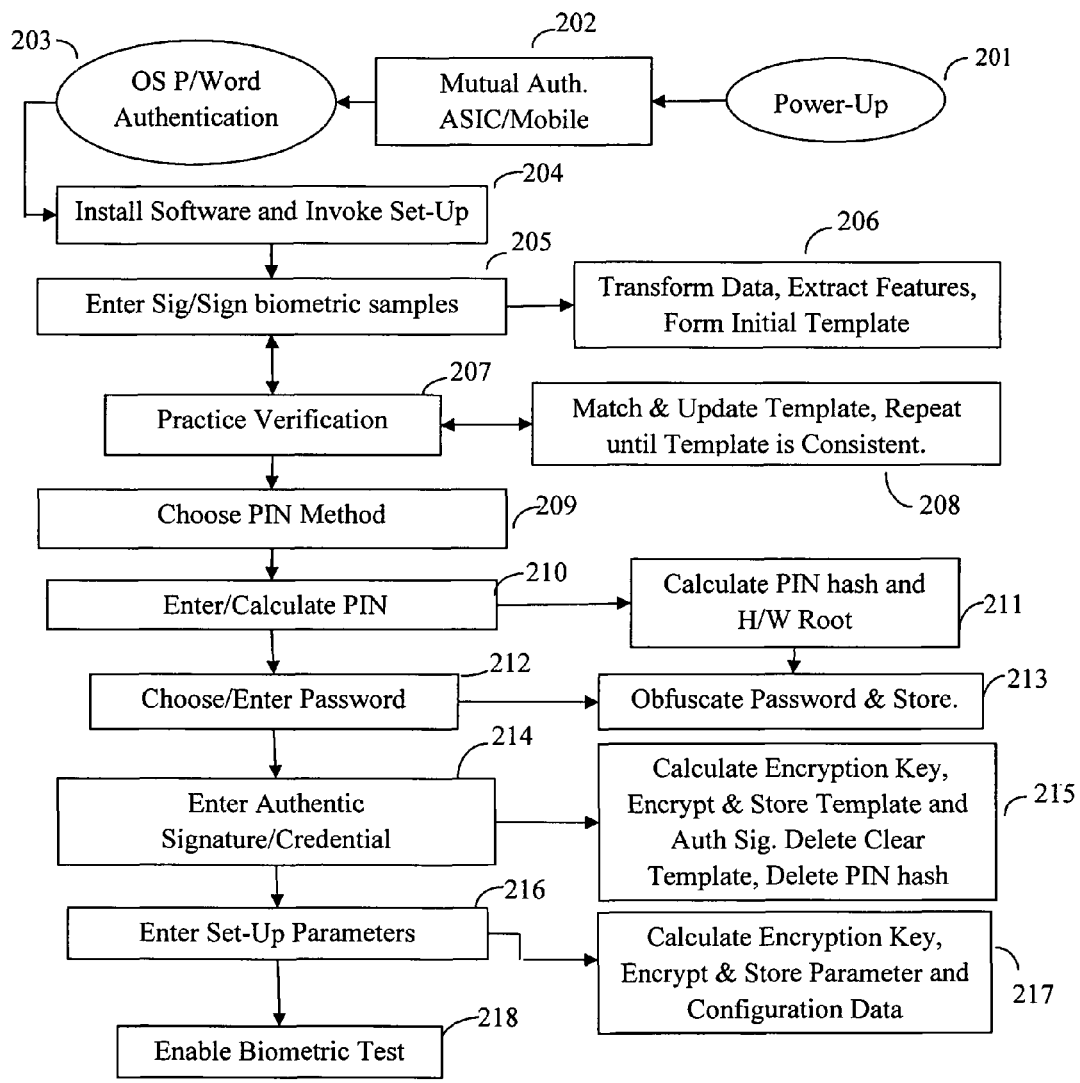
FIG. 2 shows the Registration and Enrollment logic to help provide the necessary functions for a trusted mobile device with a local biometric template.

Turning now to FIG. 2, we see a depiction of the registration and enrollment process for establishing a protected local biometric template, with PIN input, which eliminates the need to enter complex passwords for authentication.

After power up (201) a Mutual Authentication process (202) between the ASIC and the mobile device takes place to enable the ASIC module and the Mobile Device to trust each other. The mutual authentication process can be one of a number of well-known processes and is not specified in this Application.

The registration and enrollment process sets up the mobile device and user for seamless operation during a user/mobile device/relying party authentication process—see later. The steps in FIG. 2 consist of:
  a) After Mutual device Authentication, the user must first gain access to the Mobile device, typically through a special Password Authentication procedure (203), and installs the software (204) to drive the processes described in the invention.
  b) The user chooses at least one specific sign (secret sign or signature) and enters, for each one, a set of biometric signature/sign samples (205), with either a stylus or finger and these are used to form the initial biometric templates. Again it should be emphasized that a different biometric modality than signature/sign could used, in conjunction with or separate from signature/sign
  c) After transforming the biometric data according to U.S. Pat. No. 7,916,907, and extracting the biometric features, various in-built tests are conducted on the data to ensure consistency and a sufficient level of complexity before forming the initial templates (206). This process is described later.
  d) After initial template formation the user practices verification (207) and (208) until satisfied that access can be gained easily. Operations (205) to (208) are undertaken by the Biometric Enroller module (118)
  e) In box 209, the user is then prompted to decide whether to utilize an automatic PIN submission process or a PIN entry process via the PIN Input Screen (103). The choice determines whether the system requires PIN entry, for higher assurance and security, or whether no PIN entry is required so that the authentication process uses the PIN Generator part of the PIN Generator/Hasher module (114) and, therefore, relies purely on the submitted biometric information.
  f) A PIN hash is calculated, using module (114) and a value rooted in the hardware of the ASIC or the mobile device (211) is calculated using module (115)
  g) Choose and enter one or more complex passwords (212) that will be used for both user/device authentication and for deriving encryption keys. More than one key may be required (for device unlock and for network/website access control). Password policy and complexity tests defined by enterprise security requirements will be carried out prior to accepting the passwords.
  h) The password is obfuscated (213) using the PIN hash and a value rooted in the hardware of the ASIC or mobile Device—calculated as operation (211) and using the Password Obfuscator/De-Obfuscator module). This is followed by calculating the encryption key (213) with which to encrypt the biometric template and the authentic signature data using the Key Generator and Encryptor module (116). These calculations are described later.
  i) Choose and enter a quality authentic electronic signature (214), with an ink-on paper look. Several attempts may be required and the user is prompted to accept or re-sign after each attempt until a quality signature is attained. This signature will be the one released to future signature-bearing transactions. The format is a set of sequential (x,y) data and these data will be stored with the updated biometric template from process (208) in encrypted storage area (110). It is possible for styli that provide pressure values to use this to provide variations in the thickness of the stroke but the process does not rely on these data being available. Other credentials, typically required for secure transactions may be included at this stage at the user's discretion. These may, for example, be answers to typical questions asked to verify identity when passwords are forgotten, although with this invention that will be a rarity, since the probability of the system to mis-verify the correct owner is very low, especially when more than one attempt is allowed by the Enterprise/User policy. In this embodiment we proceed as follows:
  j) The authentic signature, credential data and the biometric templates are then encrypted (215) and stored in the encrypted storage area of the ASIC (or the mobile device). At this stage the clear template data and the PIN # are deleted. A second complex password can be used in the same manner to generate encrypted data for the Encrypted Communication System (122) to communicate securely with a local or remote computer, which might, for instance, be a corporate network server or a secure Web service.
  k) The system relies on certain configuration and parameter settings determined by Enterprise security policy and the parameters are set at this time (216-217) and stored in encrypted form in the Encrypted Storage area of the ASIC (109) or mobile device
  l) The operations and processes 205-217 are included in the ASIC functional Code modules (113-119)
  m) Finally, when the user is satisfied with the process (s)he enables the biometric test (218)

Turning now to FIG. 3, we describe the authentication process. After power-up (201), mutual device authentication (202) between the Mobile Device and the ASIC takes place. Process (202) uses one of a number of existing cryptographic methods to accomplish full trust between the ASIC and the Mobile Device and is not specified here. The user authentication process uses a biometric sample from the user, together with PIN entry (or PIN generation) as follows:

First of all in process (301) the Configuration and Parameter Data (109) is decrypted and System 100 is initialized. At this stage the encryption key for the decryption/encryption process cannot be tied to user input so it is generated from a function of the obfuscated password (111) and the ASIC Hardware Root using a symmetrical encryption algorithm such as the AES. The process then continues as follows:
  a) Process (302)—Capture the biometric sample, transform the sample data according to U.S. Pat. No. 7,916, 907, extract the biometric features (see later) and store them temporarily
  b) Process (303)—Capture the PIN entry data or generate a PIN from a function of the hardware root (see later). If the PIN is generated automatically the system relies purely upon the biometric test for authentication. This may be deemed sufficiently secure for some mobile devices and applications but the use of an entered PIN bolsters security substantially and, in conjunction with the biometric test, very much reduces the effectiveness of a brute force attack.
  c) Process (304)—Calculate the hardware root and then the biometric template decryption and encryption key (see later) as a function of the obfuscated password, the hardware root and the PIN hash. Decrypt the biometric template(s).
  d) Process (305)—Match the feature values extracted from Process (302) to the decrypted template(s) from Process (304). See later for the matching calculations. If the PIN is entered incorrectly the biometric templates will not decrypt sensibly and there will be no match. If the biometric sample features are substantially different from the template values, there will, again, be no match. If the biometric features match either of the templates, we proceed as follows e) Process (307)—De-obfuscate the password using a function of the hardware root and the PIN hash—see later for the calculation. Responsive to a good match (306) between the biometric sample features and the biometric template(s), release the password to the mobile device authentication system.

f) Process (308)—The encryption key is calculated in the same manner as in (304) and the biometric template is updated as a result of the most recent successful sample (see later for this calculation). It is encrypted and stored in storage area (110). If the biometric features match both templates, the template providing the better match is the one to be updated.

g) Processes (309 and 310). The previous biometric template is deleted and Normal Processing now takes place. This could involve the invocation of the same biometric authentication and encryption processes, depending upon the chosen application. FIG. 4 describes relevant applications for which these processes might be applied.

h) Process (311)—In the event of a non-match in Process (306), Failure Action, determined by policy, established by the Enterprise and/or the User, will be implemented. This might range from requesting another attempt by the User to authenticate to wiping the device of all (or all unencrypted) data.

Turning now to FIG. 4, a similar process is used to:

a) Encrypt and protect mobile device data at rest (312)
b) Release a password for Network or Web Service authentication (313)
c) Provide a trusted signature or other credentials that might be used in financial transactions and other signature-bearing transactions e.g. in Payment card systems, Healthcare and Contractual agreements (314)
d) Unlock a protected Software Applications (315)

Irrespective of which application is requested, the first action is to invoke the authentication processes where the user provides input data to the System (302 and 303). This is followed by generating the hardware root (316) which is used, in conjunction with the user generated input data to carry out the operations in process (317). Process (317) will use the System 100 ASIC (or equivalent mobile device) components (111,114, 116 and 119). Following this, the biometric sample from (302) is compared to the decrypted template from (317) and, if the match is good, the old template is updated to form the new template, which is encrypted (318) using (116) and stored in (110). Following this the selected software application (319, 320, 321 or 322) will launch. Again these processes will use the System 100 component (116, 117 119). Appropriate software code, as determined by security policy, will be signed and checked by process (120)

In the following calculations and descriptions, reference will be made particularly to Signature/Sign biometric data, which may be entered onto the screen of a POS terminal, or on the screen of a mobile device, as may a PIN. It will be very apparent that the biometric modality, instead of signature/sign, could be, for instance a fingerprint image, using a special sensor, a facial image, using a mobile device camera or an iris image using an iris camera on the POS terminal or mobile device, or indeed any other image based biometric data generated on the mobile device from a suitable sensor, e.g. fingerprint data using a fingerprint sensor. These systems operate in a manner, described later, to provide a trusted link between the user, the standalone computer and a local or remote computer.

Detailed Calculations

Again referring to FIG. 2, in an exemplary system, after mutual device authentication between the ASIC and the Mobile Device (203), and the software installation (204) biometric data from the sensor is captured using the mobile device user interface and device software handlers. These subsystems will be controlled by the ASIC or Mutual Device Processor using code from the ASIC or Mobile Device Code Storage Units, which will also first check the signed code of the user interface and handlers. The samples will be captured and pixelated and will be transformed to a consistent angle of inclination by applying one of two quadratic equations that involve a ratio of (X,Y) pixel position variances and a covariance of pixel positions in the X and Y planes. The resulting transformed (x,y) coordinates are invariant to the original angle of submission of the biometric sample. Following this the transformed data may be further rotated based upon applying a rotation calculated from the tangent of a line of regression calculated on the rotated data. Although the system may choose to use one or the other of two possible quadratic equations for the initial rotation, the equation chosen in this exemplary system defines the transformation angle through which to rotate the original X,Y axes as: $\tan^{-1}(M)$, where:

$$M=[2ra+ \text{ or } -\text{Sqrt}(4r^2a^2+a^4-2a^2+1)]/(a^2-1)$$

and where $a=\text{Sqrt}[V(X)/V(Y)]$ with $V(X)$ and $V(Y)$ being the well known definitions of the variance of the (X,Y) pixel positions and where r is the well known definition of the correlation coefficient of the (X,Y) pixel positions.

Where a approximates 1, the value of |M| may become very large and for this reason it is advisable to limit the value. A value of 10,000 works relatively well.

Although both the positive and the negative square roots of the equation will achieve the desired effect, they will provide different rotation solutions. There is no particular advantage to choosing one over the other and the negative square root option will be assumed. This rotation will always transform the original (X,Y) pixel positions to a consistent angle of inclination with respect to the rotated (x,y) axes. The transformed (x,y) data may then be further rotated through an angle calculated as the angle between a line of regression through the (x,y) data and the x axis. The resulting image might then be more representative of a natural angle of submission and is also corrected for skew. The line of regression of choice may be that derived by minimizing the sum of the squared perpendicular distances from the (x,y) points to the line of regression and this is achieved by solving the equation: $2m^3-m^2(2r_1+1)+2m(r_1+1)-(2r_1+1)=0$, for m. This equation is the corrected equation in U.S. Pat. No. 7,916,907, where m is the tangent of the angle between the line of regression and the x axis and $r_1$ is the correlation coefficient of the (x,y) data and can be calculated as:

$$r_1=[M(1-a^2)+(1-M^2)ra]/[a^2+2mra+M^2]$$

The combined rotational transformation angle can then be calculated from the original X,Y data by the well-known equation:

$$M_1=(M+m)/(1-Mm).$$

The final transformation may then be calculated by applying the following transformation to the original X,Y axes to generate the finally transformed (x,y) data from the original (X,Y) data:

$$x=X\cos w+Y\sin w$$

$$y=Y\cos w-X\sin w$$

where $\tan w=M_1$

This transformation has a very significant beneficial effect on the consistency of feature extraction thereafter and leads to a significantly higher performance biometric system, with lower False Reject and False Accept rates The biometric data will then be used in a manner later described to provide the elements of this invention. An exemplary system will now be described within the context of the Signature/Sign modality but understanding that a similar system could be developed using any biometric device integrated within the mobile device system. It will show how, as well as providing for a secure, trusted and user-friendly authentication system, that an authentic signature can be released to an electronic document or transaction and that it could be used for extremely accurate matching with the same authentic signature stored remotely in encrypted form.

Once a mobile device is trusted, or can release trusted data, it may be used in many different applications. In particular it can be used to release an electronic representation of a user's authentic electronic signature which can be appended to an electronic document to give the signature an ink-on-paper look. The authentic electronic signature can then be compared to that stored in a remote computer (124) file containing user credentials and the match should be exact, or at least very close. In order to accomplish this, the biometric template is designed to house the authentic electronic signature itself, as well as biometric template data. Since the authentic signature is stored with the template it is always stored on the mobile device in encrypted form and communicated in encrypted form. It is clear that other User Credentials, necessary for providing identity assurance to relying parties could be stored securely in this manner.

Turning again to FIG. 2, the mobile device is used to register and enroll the user and initialize appropriate parameters of the system. After Power-up (201) and mutual ASIC/Mobile Device authentication (202) the mobile device will implement its normal Password Authentication system (203) to allow the user to operate the mobile device normally. The user/owner now installs the authentication software and commences the registration & enrollment process. The user is prompted first to enroll his biometric template (206) on the mobile device by submitting a number of separate biometric samples (205). The software determines when enough enrollment samples have been submitted. The detailed method in a Signature/Sign context is described later. At this stage the user may practice verification (207) by submitting samples against the enrolled template until (s)he is comfortable with the process. The user then chooses whether to require PIN entry or PIN generation (209) as described later. The PIN is then entered or generated (210) and a one-way PIN hash is calculated and stored temporarily (211). The user then enters a chosen or imposed password (212) which may be as complex as is required for the appropriate level of encryption security. The password is obfuscated (213) as described later and stored on the mobile device. After the Authentic signature has been entered (214), the template and authentic signature are then encrypted using a generated key (215), which is a function of the PIN hash, the obfuscated password and the hardware root as described later. The user then enters other parameters and configuration data (216) and encrypts this using a key which is a function of only the hardware root and obfuscated password (217). The set-up parameters and configuration data are then stored securely in the ASIC (or the Mobile Device) and the user enables the biometric test (218). The set-up parameters will be decrypted when it is next powered up (using the key generated from the hardware-root and obfuscated password) and, following decryption, the mobile device will be re-initialized ready for local user authentication as described below Turning now to FIG. 3, we see the system flow when the invention is used for local authentication to protect access to the mobile device, and to encrypt the mobile device data at rest, including the biometric template and authentic signature/credential. After Power-Up (201) Mutual Authentication (202) takes place between the ASIC and the Mobile Device. This is followed by process (301) where the encrypted system parameters and configuration data are decrypted using a key that is a function of the hardware root and obfuscated password. These decrypted data are then used to initialize the Mobile Device for local authentication. Process (302) then captures the biometric sample, pixelates and transforms the sample data to a consistent angle of inclination according to U.S. Pat. No. 7,916,907, extracts the biometric features and stores them temporarily. During this process, certain feature values—those not dependent upon the angle of submission— will also be calculated. After the biometric sample has been captured, pixilated and transformed and the biometric features are extracted, the PIN is either entered or generated (303) according to the user/enterprise decision defined in (209). The system is designed to provide a probability of less than 1/1,000,000 of chance access when using an entered 4-digit numeric PIN together with the biometric test. A much lower probability can be achieved if the PIN is four alpha-numeric characters but it is harder for the users of small smart phone devices to provide alpha-numeric input. The method of using and generating the PIN is described later. Following this, the Hardware Root is calculated, the Template Decryption key is generated the Template is decrypted (304). Again the calculations are described later. The biometric features are then matched to the decrypted template (305) and if the match is good (306) password de-obfuscation takes place and the password is submitted to the password authentication process. (307). These methods are also described in more detail later. Thereafter, in process (308) the encryption key is generated and the template is decrypted, updated as a result of the most recent successful sample, encrypted and stored in the encrypted data storage area (110). The old template is now deleted (309). Failure to match during process (306) will result in an appropriate failure action (311) as determined by Enterprise/User policy Following this the operation continues to normal processing (310)—see FIG. 4.

Again, turning to FIG. 4, once the user has authenticated to the Mobile Device as described in FIG. 3, the Mobile Device may be used in conjunction with a remote computer (124) in a trusted system where the remote computer uses the secure socket layer or a similar protocol using a complex password released from the mobile device. The complex password for authenticating to a local or remote computer or a secure web service may be different from that required for local authentication and the need for a different password, will be determined by Enterprise policy.

Again turning to FIGS. 2 and 3 we will discuss the definitions of the calculations and actions to be performed. First, defining the terms:

Let D be an automatically generated-hardware-rooted numeric mobile device ID used in the password obfuscation and de-obfuscation process.

Let P be the power-up password, which may be chosen or imposed, required by the mobile device.

Let $P_\#$ be a one-way hashed value of the password (used to generate keys for the various encryption/decryption processes Let PIN be the user chosen PIN or the generated PIN.

Let $PIN_\#$ be a one-way hashed value of the PIN used in the obfuscation/de-obfuscation process.

Let $P_{Obf}$ be the Obfuscated Password used to calculate the password P to be used in the local or remote password authentication systems.

Let $T_{Clr}$ be the clear text biometric template used to match with the submitted biometric sample features.

Let $T_{Key}$ be the symmetrical key used to encrypt/decrypt the biometric template (215, 304, 308). The generation method is described later.

Let $T_{Enc}$ be the encrypted biometric template using a symmetric encryption function such as the Advanced Encryption algorithm.

The following methods describe the calculation of the various terms and variables used to implement the invention in this preferred embodiment. We will first choose a function $f_1$ such that:

$$f_1(D, P, PIN_\#) = P_{Obf} \text{ and}$$

$$f_1^{-1}(D, PIN_\#, P_{Obf}) = P$$

We then choose a second function $f_2$ such that:

$$f_2(P_{Obf}, PIN_\#) = T_{Key}$$

It is clear that there are many functions which obey these properties It is not the purpose of this specification to describe the exact function. There follows an example, using some values generated from these type of functions to show how the process might work.

In generating D, the numeric mobile device ID used in the obfuscation and de-obfuscation processes, it is proposed to use a function of the mobile device hardware. For this example we will proceed as follows:
 i) Let us assume that D is generated as a large set of Hex. values and let's assume, for simplicity, in this example, that there are 12 Hex. values, e.g. 9BDF135702F6.
 ii) Convert this to a numeric value by substituting the ASCII decimal codes for each character. This would give D=576668704951535548507054

In Calculating the Obfuscated Password $P_{Obf}$, from P, D and $PIN_\#$, for use in authentication and encryption/decryption routines, we might define $f_1$ in the following manner:
 i) Assume a complex password (up to, say, 32 characters depending upon enterprise security policy) has been chosen or imposed. It might be something like: ! Space "$ +. ~} {?R>4n
 ii) Convert each character to its ASCII code and subtract from 128 retaining two numeric digits for each character (e.g. 5 would be denoted as 05)—call the result $P_{nt}$ (Password Numeric Transform)
 iii) Generate D and capture or generate a Dummy PIN—see (v) below
 iv) Apply a one-way hash function to the PIN, generating (say) a 128 bit digest. Split this into 32 Hex characters and convert to a 64-digit numeric value by substituting the two-integer ASCII decimal codes for each Hex character. This is $PIN_\#$.
 v) In the case where no PIN entry is required, in order to retain program structure, we define a generated (Dummy) PIN value by choosing 4 of the hardware device ID digits. There are many, many permutations of 4 (or more) from 24 and the system implementation will provide a customizable module to provide the generated PIN and changes on a required basis.
 vi) Add together the values for D, $P_{nt}$ and $PIN_\#$ and store this set of numeric digits securely as the obfuscated password=$P_{Obf}$ $P_{Obf}$ is set and stored on the mobile device at registration/biometric enrollment when the Password and PIN are set up (213). $P_{Obf}$ will change if the PIN or the Password is changed. Changing the PIN or Password, or indeed the biometric template, will require submission of the old PIN and a successful biometric sample against the old template. It will not require user input of the old Password which can be automatically generated by the system from the stored obfuscated password and the PIN hash.

Even if the password is somehow exposed to an attacker, the only way to provide it to the authentication system is by the submission of a matching biometric sample and a correct PIN using a sensor on the actual mobile device.

In calculating the Template Encryption/Decryption Key $T_{Key}$, we define a function $f_2$ such that $T_{Key}=f_2(P_{Obf}, PIN_\#)$. Suppose we generate $T_{Key}$ by choosing $f_2$ as the sum of $P_{Obf}$ and $PIN_\#$ using the 128 least significant bits. The key is generated each time the template is encrypted or decrypted and never stored other than temporarily. The key for encrypting/decrypting the Set-up parameter data which may be accessed by the system prior to the submission of the PIN and biometric sample is generated using the generated PIN and $P_{Obf}$.

In generating the Password (for authentication or encryption) by de-obfuscation of the obfuscated password we apply the inverse function of $f=f^{-1}$ in the following manner:
 i) Get $P_{Obf}$
 ii) Generate D
 iii) Capture PIN (or supply Dummy PIN) and generate $PIN_\#$
 iv) Subtract the sum of D and $PIN_\#$ from $P_{Obf}$
 v) Subtract each successive set of two digits from 128. This is $P_{nt}$ and represents the ASCII decimal codes for the Password P to be passed to the authentication process (for local or remote authentication) only if the biometric matching is good.

In remote authentication the remote computer and the mobile device will perform mutual authentication. The remote computer will then know whether or not the mobile device is secured in this manner and assign trusted status to it. The remote computer may then be authorized by the mobile device to change the mobile device configuration and parameter data according to enterprise security policy. If the mobile device does not respond to the server's request for mutual authentication, or if the user cannot authenticate to the mobile device or if the mobile device is not a legitimate ID, the server will undertake failure action and this could be as extreme as deleting all data from the mobile device.

FUNCTION DEFINITIONS f AND $f^{-1}$

In fact, as mentioned earlier, there are many ways to define the functions f and $f^{-1}$. Here is another embodiment, which might use the Advanced Encryption Standard.

We will assume:
  PDK—is the key used by the system at power up but prior to authentication to decrypt the Parameter and Configuration data PCD
  EPCD—is the encrypted value of PCD
  UBS—is a user biometric sample
  BT—is the clear text biometric template created from biometric samples.
  TEK—is the biometric template encryption/decryption key.
   f—is a symmetric encryption function as e.g. in the AES
   $f^{-1}$—is the symmetric decryption function as in the AES
  EBT—is the encrypted biometric template CPW1—is a complex password for device unlock CPW2—is a complex password for Network Access or for the SSL.

Different passwords for different purposes might be defined in this manner and can be changed by the user without having to enter the old password HWR—is a unique device number rooted in the device hardware.

PIN—is a user-chosen PIN

PIN#—is a one-way hash of the PIN

OPW1—is the obfuscated password for device unlock

OPW2—is the obfuscated password for network access/SSL.

DAR—is sensitive device data at rest.

Then we define:

PDK=f(OPW1,HWR)—encrypted value of OPW1 using a key derived from HWR

PCD=$f^{-1}$(EPCD,PDK) decrypted value of EPCD using the PDK key.

TEK=f(OPW1,HWR,PIN#)—encrypted value of OPW1 using a key derived from HWR and PIN#

EBT=f(BT,TEK)—encrypted value of BT using TEK as the key

BT=$f^{-1}$(EBT,TEK)—decryption function for biometric template using the TEK key OPW1=f(CPW1,HWR,PIN#)

OPW2=f(CPW2,HWR,PIN#)

We can now compare the features extracted from the biometric sample with the biometric template (BT) and if all is well, update the template, delete the old template, re-encrypt and store the new one and use the de-obfuscated password, CPW1, in the device authentication process.

OPW1 and OPW2 are de-obfuscated by:

CPW1=$f^{-1}$(PPW1,HWR,PIN#) where $f^{-1}$ is the symmetrical decryption of OPW1 using the same key combination of HWR and PIN# as was used to encrypt CPW1

CPW2=$f^{-1}$(PPW2,HWR,PIN#) may then be used for Network access and/or as a single sign-on to various passwords used in the SSL.

DAR may be encrypted/decrypted using a key derived from CPW1 according to NIST SP 800-132 or it may use TEK.

At the end of the authentication/protected application session the Parameter and Configuration data, PCD are again encrypted using PDK so that:

EPCD=$f$(PCD,PDK)

The IC Card Identification Process

At physical point of sale, where the customer tenders an IC card, the following similar process can be implemented using the signature/sign modality.

1) the IC card is entered into the IC card reader, which is integrated into the point of sale (POS) terminal and the card data are passed through to the retailer's merchant bank for authorization.
2) The customer enters his signature onto the screen of the POS terminal
3) The sign data are transformed by the POS terminal according to U.S. Pat. No. 7,916,907, features are extracted and passed securely to the IC chip. The IC chip decrypts the biometric template and the authentic user signature, using a value rooted in the IC chip hardware. The IC chip determines if the template has been created or whether further signs are required to create it.
4) If the template has been created, the IC chip matches the sample features to the template and passes the result of the match to the POS terminal, together with the authentic electronic signature of the IC card owner.
5) If the template has not been created the IC chip passes just the authentic electronic signature of the card owner to the POS terminal.
6) The POS sales associate uses the card authorization result, the result of the biometric test, the appearance of the submitted signature and the appearance of the card owner's signature to determine whether the user of the card is indeed the card owner. If there is some doubt, the POS sales associate may decide to ask for further identification. The POS sales associate is the final arbiter of the whether to accept or decline the transaction.

A process, similar in concept to this, was described at the 1996 Smart Card Conference in London, UK and the 1996 Atlanta CardTec SecurTec (CTST) conference, in a paper presented by Rodney Beatson (one of the authors of this Application). The paper entitled "The Use of Electronic Signatures at Point of Service" is incorporated herein by reference. The paper advocates the use of the IC card to store the biometric template and signature, on the IC chip and to release the biometric template to the POS terminal for the POS terminal to carry out the biometric matching process. This could lead to compromise of the biometric template whilst in use in the POS terminal. Neither does the paper advocate the encryption of the biometric template or the authentic signature using a key rooted in the chip hardware. The current invention advocates biometric template and electronic signature encryption and the use of the IC chip to carry out the matching process. This provides greater security for the template and authentic signature and is a superior method. As mentioned earlier, the "1996" method is also described in U.S. Pat. No. 5,892,824 authored by, inter alia, Rodney Beatson and Mark Kelty, two of the authors of the current invention.

The Signature/Sign Biometric Process

Referring again to FIGS. 2 and 3, appropriate treatment of Signature/Sign biometric data is described below.

1) Template Building

In an exemplary system of the present invention the template is built by software from users' signs shortly after they are submitted (208). The software extracts biometric features from the sign data after allocating a time value to each (X,Y) coordinate value. In the current invention, the electronic sign verification software will:

a) Transform the (X,Y,t) values to (x,y,t) in the manner previously described (206) and extract m features of the (x,y,t) data, ($f_1 \ldots f_m$) in a manner later described.

b) Compare these values with the template stored on the mobile device (208) or transmit the values, suitably encrypted through a -network to an authentication server.

The mobile device software will, for the first N signs, calculate and store the mean value for each of the features calculated so that if $f_{1j}$ is the $j^{th}$ value of feature 1 from the $j^{th}$ sign for a specific customer, then —: Mean $f_{1j}=Mf_{1j}$ would be calculated as follows:

$Mf_{11}$ after 1 sign=$f_{11}$ $Mf_{12}$ after 2 signs is $((1-a)*Mf_{11}+a*f_{12})$ $Mf_{13}$ after 3 signs is $((1-a)*Mf_{12}+a*f_{13})$ ... etc.

Where:

for the second sign a=0.5 for the third sign a=0.33 for the $4^{th}$ sign a=0.25 ... etc for the $n^{th}$ sign a=1/n until n=9. Thereafter a=0.1 for all signs.

$Mf_2 \ldots Mf_m$ will be calculated in a similar manner.

The mobile device software will also calculate and store the mean difference of the feature values from their means as each new sign is submitted in the following manner.

If the mean difference for feature 1 after j−1 signs is $D_{1,j-1}$, then:

$$D_{1,j} = a*\text{Abs}(f_{1,j} - Mf_{j-1}) + (1-a)*\text{Abs}(D_{1,j-1}) \text{ where } a \text{ has the values:}$$

for the second sign a=0.5
for the third sign a=0.33
for the $4^{th}$ sign a=0.25 etc.
for the $n^{th}$ sign a=1/n until n=9. Thereafter a=0.1 for all signs.

$Df_2 \ldots Df_m$ will be calculated in a similar manner.

As each new sign is added, after the first two, a compatibility test may be applied to the M values to determine if they are consistent with the previous M and D values and if not that sign may be eliminated. The new mean estimates (M) of feature values and their differences (D) will be stored as the feature template values for that feature and will be used in the matching calculation.

The signature/sign template may also contain an electronic copy of the user's authentic signature, which can be released in encrypted form, in response to a local biometric match, to a remote computer system that would compare it to an identical electronic copy stored in encrypted form on its system. The authentic electronic signature would consist of the (x,y) values only and would be a constant data set in the template until changed by the user. Release of this authentic electronic signature to a remote computer could be used to accurately and remotely authenticate the author of an electronic document or transaction e.g a credit card transaction or other financial transaction.

After the system starts to match each new sign with its template values, the means and mean differences will be updated in the same way after each good match. Before (or after) successful enrolment the user may record an electronic version of his authentic signature in the form of a vector image to be stored in the template and to be released, where required, responsive to a good biometric test. Such an electronic signature would be unchanged for each release so that any match of it against previous or future authentic signatures released in the same manner would be exact or at least, very close.

How large should N be? In some systems where signs are submitted carefully, matching can take place after as few as three signs. However, some signs may take more samples to define the template and this is controlled by consistency and complexity test parameters and/or a parameter of the system.

2) Feature Matching

Suppose that, for a particular sign the value of feature i is $f_i$.
Suppose the template values for feature i are $M_i$ and $D_i$
We calculate a mismatch score sum=S=Sum[$w_i*(\text{Abs}(f_i - M_i)/D_i)$] for i=1 ... m, where there are m feature values being measured.

This can be compared against a threshold value $T_m$ to generate a match or a mismatch. The template values (M and D) would be updated for a match and not for a mismatch. There are a number of different ways to calculate mismatch distance measurements and we encompass them generally in this example.

3) Calculating $T_m$

There are m features with discriminant weightings ($w_1 \ldots w_m$), such that Sum($w_i$)=m, and they contribute to the mismatch score in the following manner so $T_m$ can be set as follows:

$$T_m = \text{Sum}(w_i) + p*\text{sqrt}(\text{Sum}(w_i^2))$$

where p is a parameter used to set the security level. The lower the value of p, the more secure is the system and vice versa. The higher the value of p, the more benign is the system and vice versa.

4) Feature Selection

In an exemplary system we envisage the features being selected using functions of the (x,y,t) data as described below:
  a. V(x), where V(x) is the variance of the x-coordinate values of the transformed sign.
  b. V(y) where V(y) is the variance of the y-coordinate values of said transformed sign.
  c. C(x,y) where C(x,y) is the covariance of the transformed sign coordinate values
  d. Total sign time.
  e. Total in-contact sign time
  f. Total out-of contact sign time
  g. Positions of (x,y) turning points with respect to time
  h. Positions of (x,y) turning points with respect to x-position
  i. Positions of (x,y) turning points with respect to y-position
  j. An estimate of total x-distance traveled.
  k. An estimate of total y-distance traveled
  l. (x,y) positions of new points of stylus contact with respect to time.
  m. New out-of-contact stylus (x,y) positions with respect to x-position.
  n. (x,y) positions of new points of stylus contact with respect to x-position
  o. (x,y) positions of new out-of-contact stylus positions with respect to time
  p. Forehand (x,y) distances
  q. Backhand (x,y) distances Forehand movements of the stylus/finger are defined when the x movement and the y movement are either both positive or both negative. Backhand movements of the stylus/finger are defined when the x movement is positive and the y movement negative, or vice-versa.

To arrive at an efficient feature set and weights ($w_i$) that discriminate powerfully between authentic signs and fraudulent signs the inventors advocate the method defined in a White Paper authored by Rodney Beatson—one of the present inventors—entitled "Feature Selection & Definition in a Biometric System with Many Possible Features Including Multi-Modal Features" dated Feb. 8, 2010 and incorporated herein by reference.

The sign verification method described in this invention is given extra strength by the sign verification accuracy observed in a limited experiment conducted on behalf of the INCITS Biometrics M1 committee. The sign data captured in this experiment was later subjected to the analysis described above in the White Paper with impressive results.

What is claimed is:

1. A stand-alone computing device, which may also be a mobile device comprising:
  a processor;
  a memory;
  a biometric sensor;
  optionally, an application specific integrated circuit (ASIC) connected to or contained within said stand-alone computing device, incorporating an ASIC processor, an ASIC memory and ASIC software storage, capable of causing code-signing, biometric authentication and encryption operations to take place;
a software storage, wherein, upon power-up of the said stand-alone computing device, and prior to executing at least some of the software stored thereon, causes the said processor and the said ASIC processor, individually or in combination to:
  check the signed code stored on the said ASIC and the said stand-alone computing device and, responsive to a successful check;
  generate a device ID from hardware characteristics of said stand-alone computing device and said ASIC;
  prompt a user to submit a plurality of biometric samples and capture said plurality of biometric samples using said biometric sensor;
  optionally, transform data of said captured biometric samples to a consistent angle of inclination;
  biometrically enroll an identity of a device user by matching said captured biometric samples to each other and determining a biometric template;
  obtain a PIN value by one of a) generating said PIN value from hardware characteristics of the said stand-alone computer and the said ASIC and b) capturing said PIN value after being entered on said device;
  generate a one-way hashed value of said PIN;
  accept a password from the user after obtaining said PIN;
  obfuscate said password using said hashed value of said PIN and said device ID, and store the obfuscated password in one of said memory and said ASIC memory;
  generate a first private encryption key using at least said hashed PIN and, optionally, one of said device ID and said obfuscated password;
  encrypt said biometric template using said first private encryption key and store the encrypted template in one of the said memory and the said ASIC memory;
  and upon subsequent stand-alone computing device power up, the said software and the said ASIC software further cause the stand-alone computing device processor and the ASIC processor, individually or in combination to:
  a) check said signed code stored on the said ASIC and the said stand-alone computing device and, responsive to a successful check:
  b) generate said device ID from hardware characteristics of said stand-alone computing device and said ASIC;
  c) capture a subsequent biometric sample from a user, using said biometric sensor;
  d) decrypt the encrypted template using said first private encryption key;
  e) de-obfuscate the obfuscated password using at least said hashed value of said PIN and said device ID
  f) provide the said de-obfuscated password for an authentication process, only if the encrypted template is correctly decrypted and said subsequent biometric sample matches said decrypted template.

2. The device of claim 1, wherein said device is connected, through a network to a remote computer and said device and said remote computer achieve mutual remote computer/device authentication by:
  a) said remote computer being configured to request an active device user to authenticate to said device using said subsequent biometric sample and said PIN;
  b) said device being configured to generate a one-way hash value of said de-obfuscated password provided for authentication;
  c) said device being configured to communicate encrypted data, including a user credential over said network, using a symmetrical encryption key, which is a function of at least one of the one-way hashed value of said provided de-obfuscated password and said device ID;
  d) said device being configured to further communicate at least said device ID, encrypted with said symmetrical encryption key, to said remote computer;
  e) said remote computer being configured to calculate said symmetrical encryption key, decrypt at least said device ID, and authenticate said device as a legitimate device on said network;
  f) said remote computer being configured to acknowledge the legitimacy of said network communication by encrypting the said hashed password using said calculated symmetrical key and communicating said encrypted hashed password to said device,
  g) said device being configured to decrypt said encrypted hashed password, test the said decrypted hashed password for authenticity and in response to said test, acknowledge remote computer legitimacy to remote computer and grant it full access to said device;
  h) said remote computer being configured to check said device for compliance with network security policy, if necessary, change parameter data for acceptability and, if appropriate, release said user credential to said remote computer, and
  i) said remote computer being configured to gain full access to said device and modify said device according to enterprise security policy when said device does not respond to said remote computer request.

3. The device of claim 1 wherein said device is connected, through a network to a remote computer, said device and said remote computer achieving mutual remote computer/device authentication by:
  a) said remote computer being configured to request an active device user to authenticate to said device using said subsequent biometric sample and said PIN;
  b) said device being configured to de-obfuscate a previously-entered, stored, obfuscated, second password which is used to release a second Private Key to implement a PKI encryption-based authentication protocol and encrypted communications between said device and the said remote computer, only after successful submission of said subsequent biometric sample and PIN,
  c) said remote computer being configured to gain full access to said device and modify said device according to enterprise security policy when said device does not respond to said remote computer request.

4. The device of claim 3, wherein said device does not contain and is not connected to said ASIC and the following tasks are undertaken:
  a) said device and said remote computer achieve mutual remote computer/device authentication by:
  b) said remote computer being configured to request an active device user to authenticate to said device using said subsequent biometric sample and said PIN;
  c) said device being configured to de-obfuscate said stored, obfuscated, previously-entered second password which is used to release said second Private Key to implement a PKI encryption-based authentication protocol between said device and the said remote computer, only after successful submission of said subsequent biometric sample and PIN.

5. The device of claim 4 where said remote computer is configured to gain full access to said device and modify said device according to enterprise security policy when said device does not respond to said remote computer request.

6. The device of claim 1, wherein the said biometric sensor comprises one of a stylus-based screen entry digitizer and a finger-based screen entry digitizer and records sign input as the biometric sample.

7. The device of claim 6, wherein said biometric samples contain, at least (X,Y) coordinate values, wherein each set of co-ordinate values has one of an associated explicit and inferred time stamp;
said biometric template is adaptive;
said device being configured to calculate, store, and update biometric features, biometric feature means, and biometric feature variances, wherein said biometric feature means are modified by choosing weights that correspond to a large discrimination score measured between authentic and imposter samples; and
said device being configured to prompt a user to choose said signs to be one of a secret sign without user feedback and a signature with user feedback.

8. The device of claim 7, wherein said biometric feature means are based on at least one of:
V(x), where V(x) is a variance of the x-coordinate values of a transformed sign, V(y), where V(y) is a variance of the y-coordinate values of a transformed sign, C(x,y), where C(x,y) is a covariance of a transformed sign coordinate values, total sign time, total in-contact sign time, total out-of contact sign time, positions of (x,y) turning points with respect to time, positions of (x,y) turning points with respect to x-position, positions of (x,y) turning points with respect to y-position, an estimate of total x-distance traveled, an estimate of total y-distance traveled, (x,y) positions of new points of stylus contact with respect to time, new out-of-contact stylus (x,y) positions with respect to x-position, (x,y) positions of new points of stylus contact with respect to x-position, (x,y) positions of new out-of-contact stylus positions with respect to time, Forehand (x,y) distances, and Backhand (x,y) distances.

9. The device of claim 1, wherein:
said biometric template contains an electronic representation of the user's valid signature which is released to electronic documents requiring it, said electronic documents subsequently being communicated to a remote computer storing a valid signature for said user, which is used to check the authenticity of the said electronic representation of user's valid signature, requiring an exact or very close match;
said biometric template includes a time-stamp associated with the last time it was used to match a biometric sample;
said biometric template includes an authentication code which is a definitive function of at least data defining said template;
said biometric template contains the number of samples contributing to its values.

10. The device of claim 1, wherein said device does not contain, and is not connected to said ASIC and performs the following tasks:
upon power-up of the said stand-alone computing device, and prior to executing at least some of the said software stored thereon, the said software causes the said processor to:
check the signed code stored on the said stand-alone computing device and, responsive to a successful check:
generate a device ID from hardware characteristics of the stand-alone computing device;
prompt a user to submit a plurality of biometric samples and capture said plurality of biometric samples using said biometric sensor;
optionally, transform data of said captured biometric samples to a consistent angle of inclination;
biometrically enroll an identity of a device user by matching said captured biometric samples to each other and determining a biometric template;
obtain a PIN value by one of capturing said PIN from said user after being entered on said device and generating said PIN from said Device ID;
generate a one-way hashed value of said PIN;
generate a first private encryption key using at least said hashed PIN
encrypt said biometric template using said first private encryption key and store the encrypted template in the said memory;
and, upon subsequent stand-alone computing device power up, the said software further causes said stand-alone computing device to:
check the signed code stored on the said stand-alone computing device and, responsive to a successful check:
generate said device ID from characteristics of said stand-alone computing device hardware components;
capture a subsequent biometric sample from a user, using said biometric sensor;
submit said PIN;
decrypt the encrypted template using said first private encryption key;
enable device for further operation only if the said subsequent biometric sample matches said decrypted template, ensuring that both the correct PIN and a correct biometric sample have been submitted and if either of them fail, causing the device not to inform the user whether the PIN or the biometric sample failed.

11. The device of claim 10, where the stand alone computer is an IC chip connected to an integrated IC card reader and wherein a user credential is released in the following manner:
a) said biometric template and a user credential are stored on an IC card;
b) said PIN hashing, template decryption and subsequent biometric sample-matching processes are undertaken on the IC card; and
c) in response to a correct PIN and biometric sample match, said user credential is released in encrypted form to be compared to information stored on a remote computer.

12. A stand-alone computing device comprising;
a processor;
a memory;
a biometric sensor;
Optionally, an application specific integrated circuit (ASIC) connected to or contained within said stand-alone computing device, incorporating an ASIC processor, an ASIC memory and an ASIC software storage, capable of causing code-signing, biometric authentication and encryption operations to take place;
a software storage, wherein, upon power-up of the said stand-alone computing device, and prior to executing at least some of the software stored thereon, causes the said processor and the said ASIC processor, individually or in combination to:
check the signed code stored on the said ASIC and the said stand-alone computing device and, responsive to a successful check;
generate a device ID from hardware characteristics of said stand-alone computing device and said ASIC;

biometrically enroll device users by capturing biometric samples, wherein said biometric samples contain, at least, (X,Y) coordinate values, and each set of co-ordinate values having one of an associated explicit and inferred time stamp;

extract biometric feature values from signs made on an electronic signing area of said stand-alone computing device, by one of a stylus and a finger, wherein said signs are chosen by the user to be one of, a secret sign without user feedback and a signature with user feedback;

verify the identity of a user by matching a new biometric sample with a previously enrolled biometric template, wherein said biometric template includes an electronic representation of said user's authentic signature and said authentic electronic signature and said authentic electronic signature is released so that it may be compared with an electronic signature stored on a second computer remote from the stand-alone computing device;

calculate means of biometric features and modify the said means by weights that correspond to a large discrimination score measured between authentic and imposter samples;

generate a password and password hash from a stored, de-obfuscated password and device ID, wherein said de-obfuscated password is generated following a PIN generation and biometric sample matching;

provide the de-obfuscated password for an authentication process, only if the encrypted template is correctly decrypted and said subsequent biometric sample matches said decrypted template.

13. The device of claim 12, wherein said device is connected, through a network to a remote computer and said device and said remote computer achieving mutual remote computer/device authentication by:
 a) said remote computer being configured to request an active device user to authenticate to said device;
 b) said device being configured to communicate encrypted data over said network using a symmetrical encryption key, which is a function of the hashed value of said password;
 c) said device being configured to communicate at least said device ID, encrypted with said symmetrical encryption key, to said remote computer;
 d) said remote computer being configured to calculate said symmetrical encryption key, decrypt at least said device ID, and authenticate said device as a legitimate device on said network;
 e) said remote computer being configured to acknowledge the legitimacy of said network communication by encrypting one of said hashed password and other known data using said symmetrical key and communicate the encrypted one to said device;
 f) said device being configured to check the value of one of said hashed password and said other known data and in response to said check, acknowledge remote computer legitimacy to remote computer and grant it full access to said device;
 g) said remote computer being configured to check said device for compliance with network security policy and may change device parameter data for acceptability and, if appropriate, release a trusted credential; and
 h) said remote computer being configured, according to security policy, to delete appropriate data from said device when said device does not respond to said remote computer request.

14. The device of claim 12, wherein said device is connected, through a network to a remote computer, said device and said remote computer achieving mutual remote computer/device authentication by:
 a) said remote computer being configured to request an active device user to authenticate to the said device using said subsequent biometric sample and said PIN;
 b) said device being configured to de-obfuscate the said previously entered stored obfuscated second password which is used to release the said second Private Key to implement a PKI encryption and authentication protocol between said device and the said remote computer, only after successful matching of a subsequent biometric sample and PIN;
 c) said remote computer being configured to gain full access to said device and modify said device according to enterprise security policy when said device does not respond to said remote computer request.

15. A stand-alone computing device comprising:
a processor;
a memory;
a biometric sensor;
Optionally, an application specific integrated circuit (ASIC) connected to or contained within said stand-alone computing device, incorporating an ASIC processor, an ASIC memory and an ASIC software storage, capable of causing code-signing, biometric authentication and encryption operations to take place;
a software storage, wherein, upon power-up of the said stand-alone computing device, and prior to executing at least some of the software stored thereon, causes the said processor and the said ASIC processor, individually or in combination to:
check the signed code stored on the said ASIC and the said stand-alone computing device and, responsive to a successful check;
generate a device ID from hardware characteristics of said stand-alone computing device and said ASIC;
capture a biometric sample from a device user using said biometric sensor;
perform authentication with a remote computer using PKI communications and a second private encryption key, wherein said second private encryption key is generated as a function of a previously entered password and said device ID;
said software further causing one of the said processor and the said ASIC processor to perform PKI encryption using at least said second private encryption key;
One of said memory and said ASIC memory storing a biometric template, which is encrypted and decrypted using said first private encryption key;
 wherein said stand-alone computing device is further enabled, in response to a good match between said biometric sample and said decrypted biometric template, and accessed by PKI communications software, without said user re-entering a PIN or password for device access or for remote computer authentication.

16. The device of claim 15, wherein said ASIC memory stores an electronic representation of said user's authentic electronic signature which, in response to a satisfactory biometric match of said biometric sample with said biometric template, is released in encrypted form, enabling comparison with a very close replica of said electronic signature stored remotely on a separate computer.

17. The device of claim 15, wherein said device and said device user authenticate to a remote computer using a CBEFF patron such as ANSI BioAPI and where the BioAPI payload includes at least said device ID encrypted with said second private encryption key.

18. A stand-alone computing device comprising:
a processor;
a memory;
a biometric sensor integrated into said stand-alone computing device;
Optionally, an application specific integrated circuit (ASIC) connected to or contained within said stand-alone computing device, incorporating an ASIC processor, an ASIC memory and ASIC software storage, capable of causing code-signing, biometric authentication and encryption operations to take place and;
software storage, wherein, upon power-up of the said stand-alone computing device, and prior to executing at least some of the software stored thereon, causes the processor and the said ASIC, individually or in combination to:
check the signed code stored on one of the said ASIC and the said stand-alone computing device and, responsive to a successful check;
generate a device ID from characteristics of hardware components of said device;
capture a biometric sample from a device user using said biometric sensor;
prompt the user to enter a PIN, which is subjected to a one-way hash function, wherein said hashed PIN is used (optionally in conjunction with said device ID) to generate said first private encryption key;
perform authentication with a remote computer using PKI communications with said second private encryption key;
one of said ASIC memory and said memory storing a biometric template, which is encrypted and decrypted using said first private encryption key;
wherein operation of said stand-alone computing device is further enabled, in response to a good match between said biometric sample and said decrypted biometric template, and accessed by PKI communications software, without said user re-entering a password for device access or for remote computer authentication.

19. The device of claim 18, wherein one of said memory and said ASIC memory stores an electronic representation of said user's authentic electronic signature which, in response to a satisfactory biometric match of said biometric sample with said biometric template, is released in encrypted form enabling comparison with a very close replica of said electronic signature stored remotely on a separate computer.

20. The device of claim 18, wherein said device and said device user authenticate to a remote computer using a CBEFF patron such as ANSI BioAPI and where the BioAPI payload includes at least said device ID encrypted with said second private encryption key.

* * * * *